United States Patent
Griffith et al.

(10) Patent No.: US 9,420,190 B2
(45) Date of Patent: *Aug. 16, 2016

(54) DUAL SENSOR CAMERA

(71) Applicant: DigitalOptics Corporation, San Jose, CA (US)

(72) Inventors: John D. Griffith, Rochester, NY (US); Jisoo Lee, Sunnyvale, CA (US)

(73) Assignee: DIGITALOPTICS CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,166

(22) Filed: Aug. 24, 2015

(65) Prior Publication Data

US 2015/0365605 A1  Dec. 17, 2015

Related U.S. Application Data

(63) Continuation of application No. 14/570,736, filed on Dec. 15, 2014, now Pat. No. 9,118,826, which is a continuation of application No. 14/035,635, filed on Sep. 24, 2013, now Pat. No. 8,913,145, which is a
(Continued)

(51) Int. Cl.
*H04N 5/232* (2006.01)
*G06T 5/50* (2006.01)
(Continued)

(52) U.S. Cl.
CPC .............. *H04N 5/23296* (2013.01); *G06T 5/50* (2013.01); *H04N 5/2251* (2013.01); *H04N 5/2253* (2013.01); *H04N 5/2258* (2013.01);
(Continued)

(58) Field of Classification Search
CPC ... H04N 5/2258; H04N 5/2628; H04N 5/272; H04N 5/247; G02B 27/0075; G02B 5/02–5/0294
See application file for complete search history.

(56) References Cited

U.S. PATENT DOCUMENTS

| 8,542,287 B2 * | 9/2013 | Griffith | ............... H04N 5/2251 348/218.1 |
| 8,913,145 B2 * | 12/2014 | Griffith | ............... H04N 5/2251 348/218.1 |

(Continued)

FOREIGN PATENT DOCUMENTS

| CN | 2872393 Y | 2/2007 |
| CN | 201184953 Y | 1/2009 |

OTHER PUBLICATIONS

U.S. Appl. No. 14/046,655, Office Action dated Aug. 28, 2015.
(Continued)

*Primary Examiner* — Paul Berardesca
(74) *Attorney, Agent, or Firm* — Larry E. Henneman, Jr.; Gregory P. Gibson; Henneman & Associates, PLC

(57) ABSTRACT

A dual sensor camera that uses two aligned sensors each having a separate lens of different focal length but the same f-number. The wider FOV image from one sensor is combined with the narrower FOV image from the other sensor to form a combined image. Up-sampling of the wide FOV image and down-sampling of the narrow FOV image is performed. The longer focal length lens may have certain aberrations introduced so that Extended Depth of Field (EDoF) processing can be used to give the narrow FOV image approximately the same depth of field as the wide FOV image so that a noticeable difference in depth of field is not see in the combined image.

22 Claims, 3 Drawing Sheets

Related U.S. Application Data continuation of application No. 12/727,973, filed on Mar. 19, 2010, now Pat. No. 8,542,287.

(60) Provisional application No. 61/161,621, filed on Mar. 19, 2009.

(51) Int. Cl.
*H04N 5/262* (2006.01)
*H04N 5/272* (2006.01)
*H04N 5/225* (2006.01)
*G02B 27/00* (2006.01)

(52) U.S. Cl.
CPC ......... *H04N5/23232* (2013.01); *H04N 5/2628* (2013.01); *H04N 5/272* (2013.01); *G02B 27/0075* (2013.01); *G06T 2207/20221* (2013.01)

(56) References Cited

U.S. PATENT DOCUMENTS

| | | | | |
|---|---|---|---|---|
| 9,118,826 B2* | 8/2015 | Griffith | ............... | H04N 5/2251 |
| 2002/0195548 A1* | 12/2002 | Dowski, Jr. | ........... | G01S 3/7835 |
| | | | | 250/216 |
| 2003/0007082 A1* | 1/2003 | Watanabe | ............. | G06T 3/4015 |
| | | | | 348/273 |
| 2008/0030592 A1* | 2/2008 | Border | .................. | H04N 5/232 |
| | | | | 348/218.1 |
| 2008/0218612 A1* | 9/2008 | Border | .................... | G01S 19/45 |
| | | | | 348/262 |

OTHER PUBLICATIONS

CN Application No. 201310381561.6, Office Action Dated Feb. 23, 2016.

U.S. Appl. No. 14/834,035, Office Action dated Jan. 20, 2016.

\* cited by examiner

DUAL SENSOR CAMERA

CROSS-REFERENCE TO RELATED APPLICATIONS

This application is a continuation of co-pending U.S. patent application Ser. No. 14/570,736 (now U.S. Pat. No. 9,118,826), entitled "DUAL SENSOR CAMERA," filed on Dec. 15, 2014 by at least one common inventor, which is a continuation of then co-pending U.S. patent application Ser. No. 14/035,635 (now U.S. Pat. No. 8,913,145), entitled "DUAL SENSOR CAMERA," filed on Sep. 24, 2013 by at least one common inventor, which is a continuation of then co-pending U.S. patent application Ser. No. 12/727,973 (now U.S. Pat. No. 8,542,287), entitled "DUAL SENSOR CAMERA," filed on Mar. 19, 2010 by at least one common inventor, which claims the benefit of U.S. Provisional Application No. 61/161,621, entitled "DUAL SENSOR CAMERA," filed on Mar. 19, 2009, all of which are incorporated herein by reference in their entireties.

BACKGROUND

Digital camera modules are currently being incorporated into a variety of host devices. Such host devices include cellular telephones, personal data assistants (PDAs), computers, and so forth. Consumer demand for digital camera modules in host devices continues to grow.

Host device manufacturers prefer digital camera modules to be small, so that they can be incorporated into the host device without increasing the overall size of the host device. Further, there is an increasing demand for cameras in host devices to have higher-performance characteristics. One such characteristic that many higher-performance cameras (e.g., standalone digital still cameras) have is the ability to vary the focal length of the camera to increase and decrease the magnification of the image, typically accomplished with a zoom lens, now known as optical zooming. Optically zooming is typically accomplished by mechanically moving lens elements relative to each other, and thus such zoom lenses are typically more expensive, larger, and less reliable than fixed focal length lenses. An alternative approach for approximating this zoom effect is achieved with what is known as digital zooming. With digital zooming, instead of varying the focal length of the lens, a processor in the camera crops the image and interpolates between the pixels of the captured image to create a "magnified but lower-resolution image. There have been some attempts to use two different lenses to approximate the effect of a zoom lens. It has been done in the past with film cameras in which the user could select one of two different focal lengths to capture an image on film. More recently, a variation on this concept with camera modules has been disclosed in U.S. Pat. Pub. No. 2008/0030592, the entire contents of which are incorporated herein by reference, which discusses a camera module with a pair of sensors, each having a separate lens through which light is directed to the respective sensor. In this publication, the two sensors are operated simultaneously to capture an image. The respective lenses have different focal lengths, so even though each lens/sensor combination is aligned to look in the same direction, each will capture an image of the same subject but with two different fields of view. The images are then stitched together to form a composite image, with the central portion of the composite image being formed by the relatively higher-resolution image taken by the lens/sensor combination with the longer focal length and the peripheral portion of the composite image being formed by a peripheral portion of the relatively lower-resolution image taken by the lens/sensor combination with the shorter focal length. The user selects a desired amount of zoom and the composite image is used to interpolate values therefrom to provide an image with the desired amount of zoom. Unfortunately, the disclosure in this publication is largely conceptual and lacks in certain details that would be needed to provide optimal performance.

The foregoing examples of the related art and limitations related therewith are intended to be illustrative and not exclusive. Other limitations of the related art will become apparent to those of skill in the art upon a reading of the specification and a study of the drawings.

DETAILED DESCRIPTION

The following description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
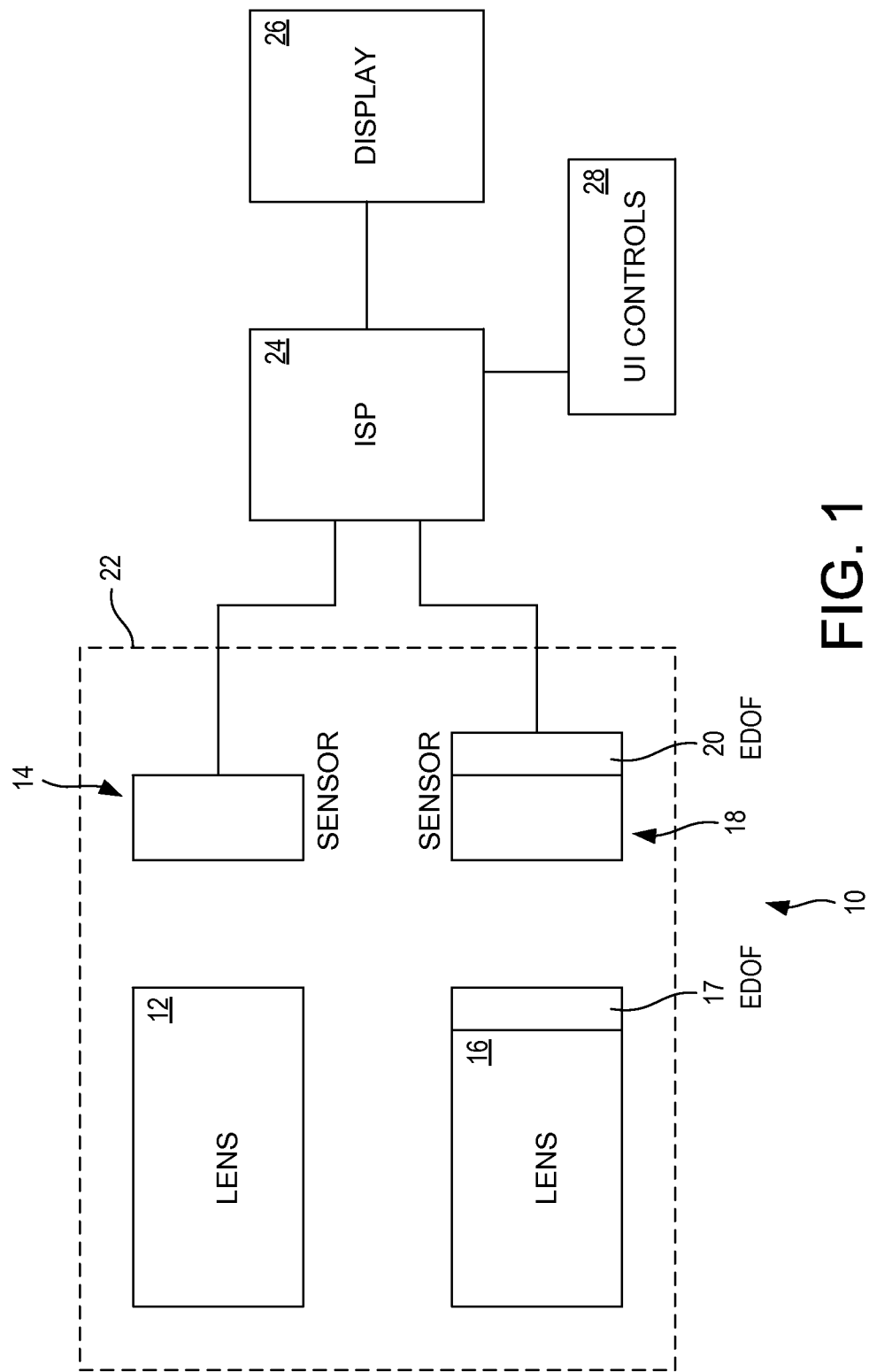
FIG. 1 is a block diagram of a camera.

A camera 10 is shown in FIG. 1. The camera 10 may include a first lens 12 having a relatively-shorter focal length and a first sensor 14 that are located proximate to and substantially aligned with a second lens 16 having a relatively-longer focal length and a second sensor 18. By having the combined first lens and first sensor aligned with the combined second lens and second sensor, the sensors can each obtain an image of substantially the same subject. Of course, due to the different focal lengths of the lenses 12 and 16, the first sensor 14 will obtain an image of the subject with a relatively-wider field of view (FOV) as compared to the relatively-narrower FOV of the image obtained by the second sensor 18.

In most cases, each sensor 14 and 18 would perform certain basic image processing algorithms such as white balancing, and so forth. The second lens 16 has an additional reference number 17 to indicate that it is designed to work with Extended Depth of Field (EDoF) processing, which may involve introducing specific monochrome or chromatic aberrations into the lens design as determined by the EDoF technology, or by adding a phase mask (e.g., a cubic phase mask) to the lens. Each sensor may also perform additional image processing such as EDoF processing. In this example, the EDoF processing 20 is shown as part of sensor 18 and is not a part of sensor 14. In other examples, not illustrated here, each of the sensors 14 and 18 may include EDoF processing, or other combinations may be employed such as sensor 14 including EDoF processing while sensor 18 does not. Similarly, while this example shows only the second lens 16 being designed to work with EDoF processing, any other combination may be possible, including each of the lenses 12 and 16 being designed to work with EDoF processing. The lenses 12 and 16 could be made of any acceptable material, including plastic, glass, optical ceramic, diffractive elements, or a composite.

EDoF processing will be discussed here generally, but much greater detail can be found in the literature associated with the following companies that are believed to be actively developing EDoF technology: DxO Labs, S.A. of Boulogne, France (under its DIGITAL AUTO FOCUS™ trademark); CDM Optics, Inc. of Boulder, Colo. (under its WAVEFRONT CODING™ trademark); Tessera, Inc. of San Jose, Calif. (under its OPTIML FOCUS™ trademark); and Dblur Technologies Ltd. of Herzliya Pituach, Israel (whose relevant IP assets are now owned by Tessera)(under its SOFTWARE LENS™ trademark). In addition, the following patents, published patent applications, and technical articles are believed to disclose related EDoF technology: PCT/FR2006/050 197; PCT/FR2008/05 1265; PCT/FR2008/05 1280; U.S. Pat. No. 5,748,371; U.S. Pat. No. 6,069,738; U.S. Pat. No. 7,031,054; U.S. Pat. No. 7,218,448; U.S. Pat. No. 7,436,595; PCT/IL2004/00040; PCT/IL2006/01294; PCT/IL2007/00381; PCT/IL2007/000382; PCT/IL2007/00383; PCT/IL2003/000211; and Dowski & Cathey "Extended Depth of Field Through Wavefront Coding," Applied Optics, 34, 11, p. 1859-66 (1995); the contents of each of which are incorporated herein in their entirety.

Depth of field refers to the depth of the longitudinal region in the object space that forms an image with satisfactory sharpness at some focus position. In ordinary optics, the paraxial depth of field is determined by the allowable paraxial blur, the lens focal length, and the lens f-number. See for example, Warren J. Smith, Modern Optical Engineering, 3rd Edition, Chapter 6. Within the paraxial model, the depth of field of the lens is fixed once these choices are made.

A more sophisticated model of depth of field in ordinary optics includes the lens aberrations and diffraction effects. This model typically analyzes the depth of field using through focus Modulation Transfer Function (MTF) calculations. In this model, the depth of focus depends on the aberrations of the lens and the diffraction occurring at the f-number of the lens. The depth of field is determined by these factors plus the focal length of the lens. As the aberrations become smaller, the depth of field of the lens approaches a limit set by diffraction, which is determined by the lens f-number, the focal length of the lens, and the allowable MTF drop at various object distances. Similarly to the paraxial depth of field model, the maximum depth of field is set by the allowable blur (MTF drop), the lens f-number, and the lens focal length.

In the ordinary optical design process, the goal is to minimize the aberrations present in the lens, consistent with size and cost constraints. The goal is form a sharp image when the lens is in focus. In extended depth of field (EDoF) technology, the depth of field is increased by a combination of the use of a specially designed lens together with EDoF image processing of the image captured by the sensor. Various types of EDoF technology have been proposed or implemented by various companies (some of which are mentioned above).

The various EDoF technologies all require that the lens not form the sharpest image possible at best focus, but rather form an image that is degraded in a special way. In one implementation, this is achieved with a phase mask, which "degrades" the image. In other implementations, this is achieved by introducing specified monochromatic or chromatic aberrations into the lens design. A sharp image is then recovered through signal processing techniques. The details of how the image is degraded and how it is recovered differ between the various EDoF technologies.

In the design of a lens for use with EDoF technology, the goal is not to minimize the aberrations present in the image formed by the lens, but rather to introduce with the use of a phase mask or a special set of aberrations into the image formed by the lens that allows recovery of a sharp image over an extended depth of field. The exact aberrations or type of phase mask that must be introduced depends on the particular EDoF technology in use. In some cases, these aberrations are introduced by the addition of an additional optical element, such as a cubic phase element (or cubic phase mask), to an otherwise sharp lens. In other cases, axial color or monochromatic aberrations may be introduced into the lens design itself.

In the example shown in FIG. 1, lens 16 has certain aberrations therein that are designed for use with the EDoF processing 20 that will be performed by the sensor 18 that corresponds to the lens 16. In this example, the lens 16 may be a lens having a focal length of 7.2 mm, a field of-view (FOV) of 32 degrees, and an f-number of f/2.8. The lens 12 may be a lens having a focal length of 3.62 mm, an FOV of 63 degrees, and an f-number of f/2.8. These lens specifications are merely exemplary and any other suitable lens characteristics could be acceptable. In addition, one or both of the lenses 12 and 16 could be variable focal length (zoom) lenses.

In the example shown in FIG. 1, the two lenses 12 and 16 have the same f-number so that the illuminance of the light received at the sensors 14 and 18 is equivalent. With equivalent illuminance, the sensors can be operated at similar levels of amplification and with similar exposure times. In this manner, the separate images captured by the separate sensors 14 and 18 can be of similar levels of brightness and contrast. By having similar levels of amplification, the background noise in each image will be similar. By having similar exposure times, artifacts in each image due to subject motion will be similar. By maintaining similarity as to these two characteristics in the two images, the composite image formed from the two images will be more acceptable to the user.

Examples of sensors that could be used for sensor 18 are Model Nos. VD6826 and 69031953 (each of which include DxO EDoF algorithms) and VD68031853 (which includes Dblur EDoF algorithms), each of which are available from STMicroelectronics of Geneva, Switzerland. Examples of sensors that could be used for sensor 14 are these same sensors mentioned above (with EDoF processing turned off) or similar sensors that do not have EDoF capabilities, such as VD6852 or VD6892. In this example, each of the sensors is a Bayer sensor, which uses a color filter array over the array of separate pixels, as is well known. Such sensors sense green light at every other pixel, with the intervening pixels alternating between red pixels and blue pixels. The raw sensed signals are later provided to a demosaicing algorithm, which interpolates between the pixels to obtain a full color signal for each pixel. However, the invention is not limited to use with a Bayer sensor and will work equally well with sensors having a different color filter array, cameras based on time-sequential color, cameras using beamsplitters and separate sensors for each color channel, and other camera architectures, provided these architectures are consistent with the operation of one of the underlying EDoF technologies.

In some cases, the camera 10 may be considered to include only the functional portions described above. In other cases, these portions (referred to collectively as a camera module 22) may also be combined with certain downstream components as part of the camera 10. In such case, the camera 10 may also include an image signal processor (ISP) 24, a display 26, and user interface controls 28. Of course, as is well known in the camera industry, cameras may also typically include several other components that are omitted here for simplification. For example, as non-limiting examples, these other components may include batteries, power supplies, an interface for the application of external power, a USB or other interface to a computer and/or printer, a light source for flash photography, auto-focus and image stability controls, internal memory, one or more ports for receiving an external memory card or device (e.g., an SD or xD memory card), and in the case of the use of a camera in a mobile phone, a microphone, speaker, transmitter/receiver, and an interface for an external microphone and speaker (e.g., a Bluetooth headset).

The user interface controls 28 may include conventional controls that are used to operate the camera, including controls to instruct the camera to capture one or more images, as well as to manipulate the images, and many other functions. The display 26 may be a conventional display that displays images automatically as directed by the ISP 24 or upon request by the user via the user interface controls 28 and ISP 24. The ISP 24 includes certain distortion-correction algorithms that smoothly match features between the two separate images when the composite image is formed. Further, the ISP 24 may include the demosaicing algorithm (referenced above with regard to Bayer sensors), sharpening algorithms, and other standard algorithms used in ISPs in such applications. The ISP also includes algorithms to create the combined image from the two captured images. A suitable approach for combining the images is discussed in U.S. Pat. Pub. No. 2008/0030592, referenced above.

Figure 2:
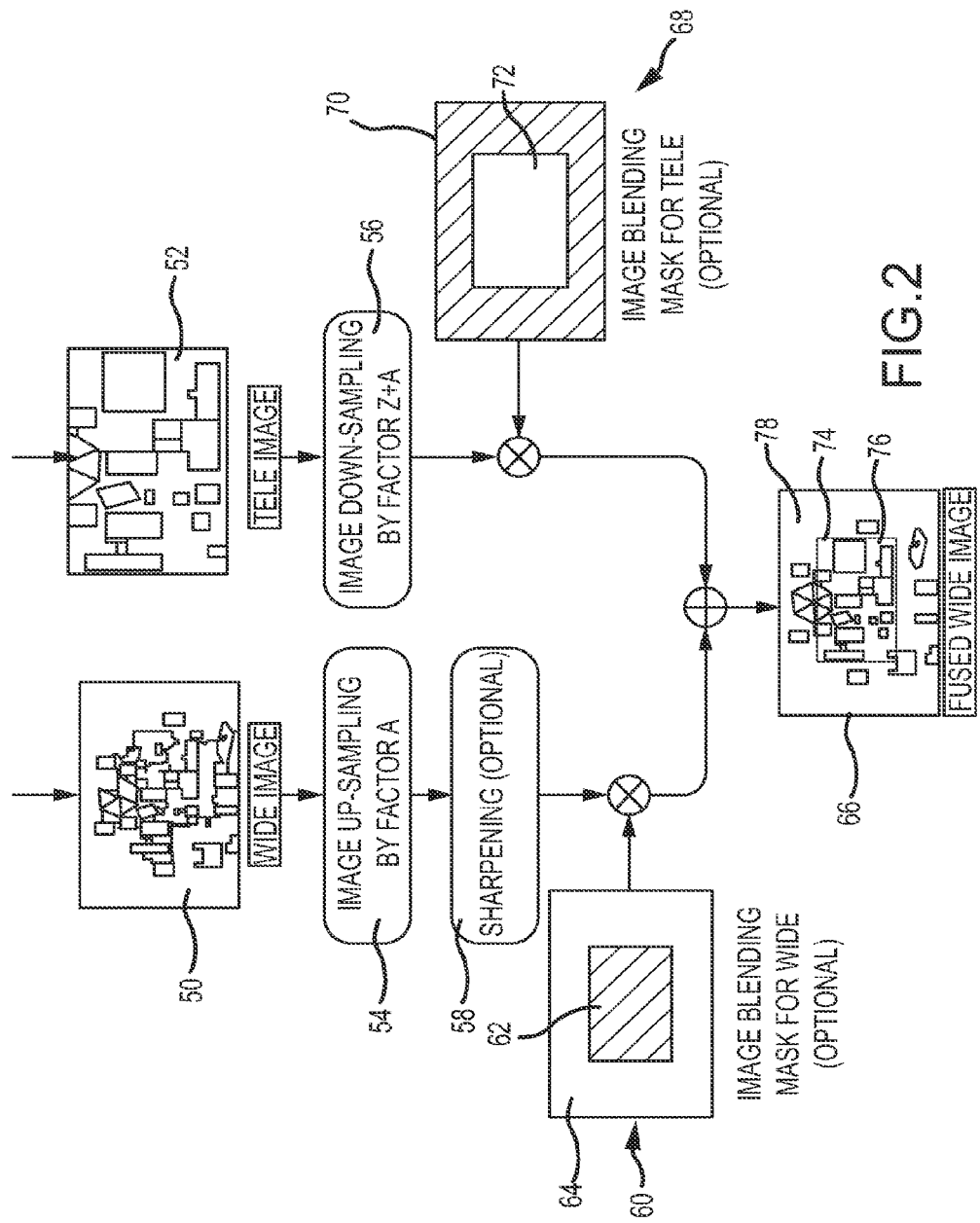
FIG. 2 is an illustration of the combination of two images into a single combined image.

FIG. 2 shows both the image 50 from the first sensor (the one with the wider FOV) and the image 52 from the second sensor (the one with the narrower FOV). The wide FOV image 50 goes through up-sampling 54, while the narrow FOV image 52 goes through down-sampling 56. In order to ensure that the two images are combined to form a single congruent image without any visible mismatch between the appearance of image objects, the wider FOV image 50 commonly undergoes an image up-sampling operation (i.e. digital zoom) whose scaling factor, A, may range from 1 (i.e. no up-sampling operation applied) to Z, where Z is the ratio of FOV of the first sensor to the ratio of FOV of the second sensor. The narrow FOV image 52 undergoes a down-sampling operation whose scaling factor, B, is given by Z divided by A. Hence, the relationship between the two scaling factors is generally given by the equation:

$$Z = A \times B$$

The amount of up-sampling 54 and down-sampling 56 represents a different trade-off between the sharpness quality and the size of the combined image. The up-sampling factor is generally controlled by the "digital zoom" setting selected by the user; however, it is possible to select a value of A which does not match the "digital zoom" setting in order constrain the number of pixels in the combined image. After the wide FOV image 50 has been up-sampled it may optionally go through further sharpening 58. Then the wide FOV image 50 has a mask 60 applied thereto, which serves to block a central portion 62 of the image 50 while allowing a peripheral portion 64 of the image 50 to be used in forming the combined image 66. After the narrow FOV image 52 has been down-sampled it has a mask 68 applied thereto, which serves to block a peripheral portion 70 of the image 52 while allowing a central portion 72 of the image 52 to be used in forming the combined image 66. As differentiated by a border 74 in the combined image 66, the central portion 76 of the combined image 66 is taken from the narrow FOV image 52 while the peripheral portion 78 of the combined image 66 is taken from the wide FOV image 50.

Figure 3:
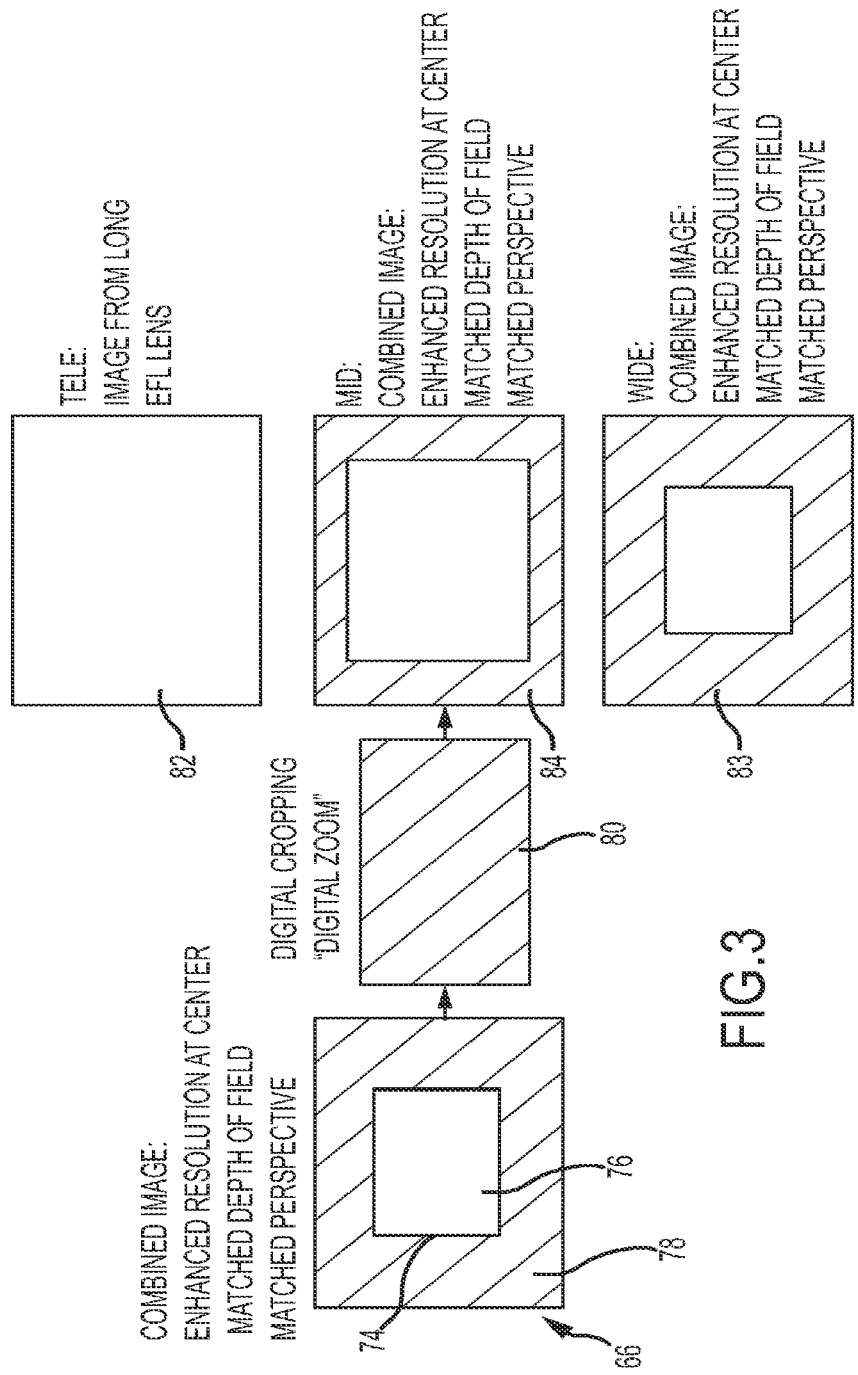
FIG. 3 is an illustration of digital zooming of the combined image.

FIG. 3 shows the digital cropping of the peripheral region of the combined image 66 such that the resulting image has a smaller FOV 80 corresponding to the "digital zoom" setting specified by the user. This may be referred to as "digital zooming" of the combined image 66. In this figure, the central portion 76 of the combined image 66 is differentiated from the peripheral portion 78 by the border 74 (although the border 74 will not actually be visible to a user in operation). In one zoomed image 82, the camera 10 has been zoomed to a position where only the central portion 76 of the combined image 66 (which is the narrow FOV image 52) is used. At the other end of the spectrum, another zoomed image 83 can be created, in which the combined image 66 is used. At an intermediate position in the spectrum, a different zoomed image 84 can be created. For this image, the central portion 76 of the combined image 66 is expanded and only a fraction of the peripheral portion 78 of the combined image 66 is used.

Alternatively, the camera module 22 could include one or more ISPs located thereon. They could be separate from or integrated into the sensors. Further, while the lenses 12 and 16 described herein are fixed focal length, either or both could be variable focal length (zoom) lenses.

It should be appreciated that with the camera 20 described above, the combined image will have similar levels of brightness, background noise, motion artifacts, and depth-of field. This will make for a more pleasing and acceptable combined image. If the EDoF technology were not utilized, this would be impossible to achieve. This is because with conventional optics it is not possible to get the same illuminance delivered to the image plane from two lenses of different focal length while at the same time matching the depth of field. One can choose to have the same image illuminance; for example, by each of the lenses having an f-number of f/2.8. But in such case, the depth of field will be much greater for the shorter focal length lens. Alternatively, one can choose to have the same depth of field; for example, with the focal lengths for the two lenses used in the example described above in conjunction with FIG. 1, the longer focal length lens would need to have an f-number of approximately f/11 to have the same depth of field of the shorter focal length lens. But in such case, the optical power delivered by the longer focal length lens (at f/11) would be $\frac{1}{16}^{th}$ of the optical power delivered by the shorter focal length. The camera 10 described above allows for the optical power and depth of field to be the same for each lens/sensor combination. Of course, it would also be possible to obtain the same optical power and depth of field with different focal length lenses if the two different image sensors were operated with different amounts of amplification or with different exposure times. Unfortunately, this would change the background noise level or motion artifact level, respectively, between the two images.

One variation on the disclosure above is that there could be some type or pre-cropping of the peripheral and central regions of the wide FOV image prior to the-upsampling operation (to reduce the processing and memory requirements of the image processing involved in the upsampling operation).

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and subcombinations thereof. It is therefore intended that the following appended claims and claims hereafter introduced are interpreted to include all such variations, modifications, permutations, additions, and sub-combinations as are within their true spirit and scope.

We claim:

1. A method of generating a combined image with a camera, the method comprising:
   receiving light with a first sensor from a first lens having a first focal length;
   capturing a first image formed on the first sensor with the first sensor;
   receiving light with a second sensor from a second lens having a second focal length that is longer than the first focal length;
   capturing a second image formed on the second sensor with the second sensor, the combination of the first sensor and the first lens and the combination of the second sensor and the second lens being directed toward the same subject;
   combining the first image and the second image together to form a single combined image with the second image forming a central portion of the single combined image and a peripheral portion of the first image forming a peripheral portion of the single combined image; and
   applying a mask to at least one of the first image and the second image before the first image and the second image are combined together, the mask blocking a portion of the image to which the mask is applied; and wherein
   the combining of the first and the second images includes at least one of up-sampling the first image and down-sampling the second image.

2. The method of claim 1, wherein the mask is applied to the first image, the mask blocking a central portion of the first image and allowing the peripheral portion of the first image to be used in forming the single combined image.

3. The method of claim 1, wherein the mask is applied to the second image, the mask blocking a peripheral portion of the second image and allowing a central portion of the second image to be used in forming the single combined image.

4. The method of claim 1, wherein the up-sampling is performed with a scaling factor A and the down-sampling is performed with a scaling factor B.

5. The method of claim 4, wherein:
   Z is the ratio of the field of view (FOV) of the first sensor to the FOV of the second sensor; and $Z = A \times B.$ 6. The method of claim 5, wherein A is a value in the range between and including 1 and Z.

7. The method of claim 4, wherein:
   A is a value in the range between and including 1 and Z; and
   Z is the ratio of the field of view (FOV) of the first sensor to the FOV of the second sensor.

8. The method of claim 1, wherein the first lens and the second lens have substantially equal f-numbers.

9. The method of claim 1, wherein the first lens and the second lens are selected such that the illuminance on the first sensor and the illuminance on the second sensor are equivalent.

10. The method of claim 1, wherein the amount of up-sampling is determined based at least in part on a digital zoom setting selected by a user.

11. The method of claim 1, wherein the central portion and the peripheral portion of the single combined image have similar levels of at least one of brightness, background noise, motion artifacts, and depth of field.

12. The method of claim 1, wherein:
   the second lens has been designed to work with extended depth of field (EDoF) processing by the introduction of specified aberrations into the second image formed on the second sensor; and
   the second image is subjected to EDoF processing to focus the second image.

13. The method of claim 12, wherein:
   the first image has a first depth of field determined by the combination of the first sensor and the first lens; and
   the EDoF processing of the second image results in the second image having a second depth of field that is substantially equal to the first depth of field.

14. The method of claim 12, wherein:
   the first lens has been designed to work with extended depth of field (EDoF) processing by the introduction of specified aberrations into the first image formed on the first sensor; and
   the first image is subjected to EDoF processing to focus the first image.

15. A method of generating a combined image with a camera, the method comprising:
   receiving light with a first sensor from a first lens having a first focal length;
   capturing a first image formed on the first sensor with the first sensor;
   receiving light with a second sensor from a second lens having a second focal length that is longer than the first focal length;
   capturing a second image formed on the second sensor with the second sensor, the combination of the first sensor and the first lens and the combination of the second sensor and the second lens being directed toward the same subject; and
   combining the first image and the second image together to form a single combined image with the second image forming a central portion of the single combined image and a peripheral portion of the first image forming a peripheral portion of the single combined image; and wherein
   the step of combining the first and the second images includes at least one of up-sampling the first image with a scaling factor A and down-sampling the second image with a scaling factor B;
   A is a value in the range between and including 1 and Z; and
   Z is the ratio of the field of view (FOV) of the first sensor to the FOV of the second sensor.

16. The method of claim 15, wherein the first lens and the second lens have substantially equal f-numbers.

17. The method of claim 15, wherein the first lens and the second lens are selected such that the illuminance on the first sensor and the illuminance on the second sensor are equivalent.

18. The method of claim 15, wherein the amount of up-sampling is determined based at least in part on a digital zoom setting selected by a user.

19. The method of claim 15, wherein the central portion and the peripheral portion of the single combined image have similar levels of at least one of brightness, background noise, motion artifacts, and depth of field.

20. The method of claim 15, wherein:
   the second lens has been designed to work with extended depth of field (EDoF) processing by the introduction of specified aberrations into the second image formed on the second sensor; and
   the second image is subjected to EDoF processing to focus the second image.

21. The method of claim 20, wherein:
the first image has a first depth of field determined by the combination of the first sensor and the first lens; and
the EDoF processing of the second image results in the second image having a second depth of field that is substantially equal to the first depth of field.

22. The method of claim 20, wherein:
the first lens has been designed to work with extended depth of field (EDoF) processing by the introduction of specified aberrations into the first image formed on the first sensor; and
the first image is subjected to EDoF processing to focus the first image.

* * * * *